(12) United States Patent
Csurka et al.

(10) Patent No.: US 9,477,913 B2
(45) Date of Patent: Oct. 25, 2016

(54) PRINT PATH OBFUSCATION METHOD AND SYSTEM FOR DOCUMENT CONTENT ANALYTICS ASSESSMENT

(71) Applicant: Xerox Corporation, Norwalk, CT (US)

(72) Inventors: Gabriela Csurka, Crolles (FR); Jerome Pouyadou, Grenoble (FR); Jutta Katharina Willamowski, Grenoble (FR); Yves Hoppenot, Notre-Dame-de-Mesage (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/539,492

(22) Filed: Nov. 12, 2014

(65) Prior Publication Data

US 2016/0132277 A1    May 12, 2016

(51) Int. Cl.
*G06F 3/12* (2006.01)
*G06K 15/02* (2006.01)
*G06K 15/00* (2006.01)
*G06F 17/22* (2006.01)

(52) U.S. Cl.
CPC .......... *G06K 15/1867* (2013.01); *G06F 17/22* (2013.01); *G06K 15/4095* (2013.01)

(58) Field of Classification Search
CPC .. G06F 3/1238; G06F 3/1222; G06F 3/1298; G06K 15/1867; G06K 15/4095
USPC ................... 358/2.1, 1.9, 1.15; 707/748, 758
See application file for complete search history.

(56) References Cited

U.S. PATENT DOCUMENTS

| 8,666,992 B2 | 3/2014 | Serrano et al. |
| 8,812,870 B2 | 8/2014 | Meunier et al. |
| 2011/0013219 A1* | 1/2011 | Nuggehalli ........... G06F 3/1203 358/1.15 |
| 2013/0271777 A1* | 10/2013 | Ito .......................... G06K 15/18 358/1.9 |
| 2014/0247461 A1 | 9/2014 | Willamowski et al. |

OTHER PUBLICATIONS

A. Gordo et al., "Document Image Representation, Classification and Retrieval in Large-Scale Domain", Universitat Autonoma de Barcelona, Jan. 11, 2013, 140 pages.
F Perronnin et al., "Fisher Kernels on Visual Vocabularies for Image Categorization", 8 pages, in CVPR 2007.

* cited by examiner

*Primary Examiner* — Quang N Vo
(74) *Attorney, Agent, or Firm* — Fay Sharpe LLP

(57) ABSTRACT

Disclosed is a method and system of differential processing a print job including one or more original documents to render an obfuscated version of the print job. According to an exemplary method, the differential process replaces letters of an original document with randomly selected characters of substantially the same size and location as the original document and objects such as images/graphics are replaced with blurred versions of substantially the same size and locations as the objects in the original document. The differential process creates an obfuscated version of the print job which is illegible and useful for further processing where privacy of documents included in the print job is required.

14 Claims, 11 Drawing Sheets

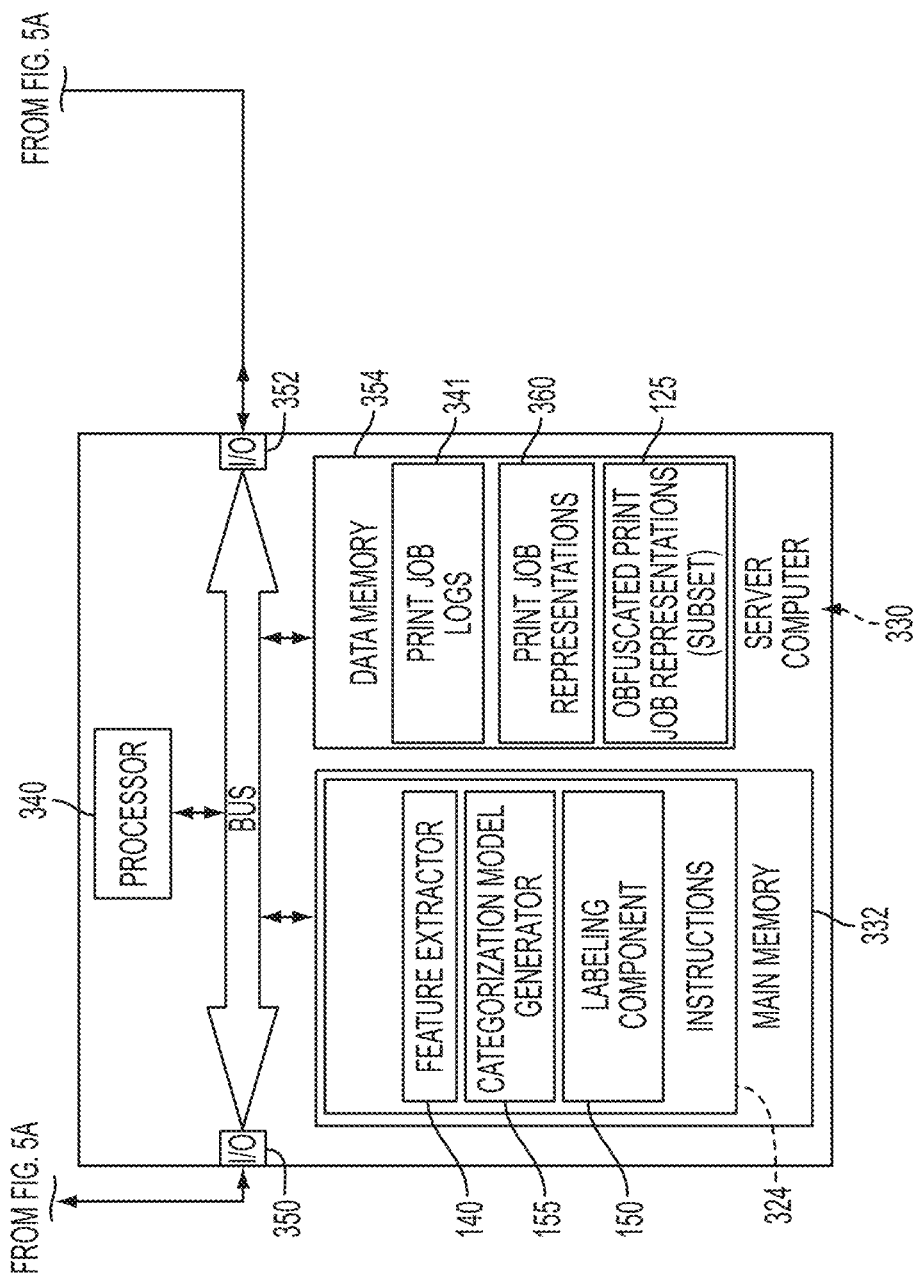

Finance and Accounting Outsourcing

Overview   Solutions   Library   Jobs

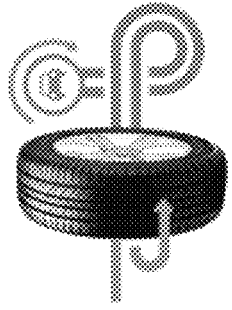

Share   Follow

Quick Links

Solutions

Corporate Finance Solutions Services

Decision Support, Financial Planning and Analysis

Record to Report

Order to Cash Process Services

Related

Procurement (Source-to-Pay)

Decision Support, Financial Planning and Analysis

In the past decade it's become increasingly important for organizations to capture and utilize the power and utility of their resident data and information to make better, more informed, fact-based decisions.

By leveraging the innovation of our workflow enhancement tools, we deliver these financial planning and analysis services to our clients as part of our broader FAO portfolio:

- Strategic Planning
- Forecasting
- Data Capture and Analytics
- Business Performance Analysis
  - Business Case Support
  - Mergers and Acquisitions (M&A) / Divestiture
- Maintaining and improving process controls
- Data integration across client legacy finance systems
- Scanning technologies or portal views of established data
- Workflow automation tools and metrics

FIG. 7

PRINT PATH OBFUSCATION METHOD AND SYSTEM FOR DOCUMENT CONTENT ANALYTICS ASSESSMENT

CROSS REFERENCE TO RELATED PATENTS AND APPLICATIONS

U.S. Patent Publication No. 2014/0247461, published Sep. 4, 2014, by Willamowski et al. and entitled "SYSTEM AND METHOD FOR HIGHLIGHTING BARRIERS TO REDUCING PAPER USAGE", is incorporated herein by reference in its entirety.

BACKGROUND

This disclosure and the exemplary embodiments provided herein relate to a document processing method and system to support document classification and/or clustering while maintaining privacy of information included in the document(s).

According to an embodiment disclosed herein, the exemplary method identifies recurring paper-based tasks by storing and analyzing print logs, estimates the impact of each task in terms of consumable usage, such as in terms of paper volume and/or power consumption, and identifies constraints that explain the reasons for printing, allowing identification of the barriers that prevent moving these tasks from paper to digital form. The exemplary method performs these document content analytics while maintaining privacy of information included in the analyzed printed documents/papers, thereby enabling a third party to complete the document content analytics assessment In current practice, paper document content analytics is done in a completely manual fashion, through surveys and interviews, directly with the customers and their employees. In U.S. Patent Publication No. 2014/0247461, published Sep. 4, 2014, by Willamowski et al. and entitled "SYSTEM AND METHOD FOR HIGHLIGHTING BARRIERS TO REDUCING PAPER USAGE", a method to partially automate this process using machine learning techniques is disclosed. This method enables automatic analysis of printed documents' content to cluster and classify the documents and requires manually labelled documents for training. Two issues arise in the context of manual document labelling: privacy on one hand and obtaining a sufficient set of consistently labelled documents on the other hand. Privacy is also a concern for customers with respect to the automatic document content analysis step: indeed, customers do not want to disclose their document content to third parties, which in turn prevents resorting to external services for the automatic document content analysis.

The privacy issue with respect to manual labelling is the following: to correctly label a document, the labelling person needs to be able to access, visualize and understand the document and its content. To avoid any issue, in the method proposed in U.S. Patent Publication No. 2014/0247461, published Sep. 4, 2014, by Willamowski et al. and entitled "SYSTEM AND METHOD FOR HIGHLIGHTING BARRIERS TO REDUCING PAPER USAGE", the document owners themselves label the documents. The privacy issue rises if the labelling is delegated to another person, different from the document owner. However, employing a unique, possibly external subject matter expert to do the labelling would enable obtaining a sufficient set of consistently labelled documents and this within a limited time frame.

Provided herein is a method and system to obfuscate print document content prior to the labelling step. The method and system provides privacy and retains sufficient details of the document content to enable adequate labelling. It thus allows delegating the labelling process to external persons. Furthermore, the disclosed method and system allows disclosing and delivering the obfuscated documents to an external service provider for the automatic document content analysis.

U.S. Patent Publication No. 2014/0247461, published Sep. 4, 2014, by Willamowski et al. and entitled "SYSTEM AND METHOD FOR HIGHLIGHTING BARRIERS TO REDUCING PAPER USAGE", discloses a system/method for highlighting barriers to reducing paper usage: This disclosure provides a system and method to help organizations to move from paper to digital workflows by (1) identifying recurring paper-based tasks, (2) estimating the impact of each task in terms of paper volume, and (3) identifying the barriers that prevent moving these tasks from paper to digital. Patent Publication No. 2014/0247461 combines automatic clustering/categorization of print documents with manual labelling of those documents with the corresponding task and reason for printing. One limitation of this method is that, in order to guarantee privacy, only the document owner can be asked to do the labelling. The method and system provided herein palliates this problem, ensuring privacy through appropriate obfuscation of the document content, and thereby allowing subject matter experts to label the print documents accordingly.

U.S. Pat. No. 8,666,992, issued Mar. 4, 2014, by Serrano et al., and entitled "PRIVACY PRESERVING METHOD FOR QUERYING A REMOTE PUBLIC SERVICE" discloses a privacy-preserving method for processing a multimedia document by a public remote service: The objective here is to submit a multimedia document (image, sound, and video) to a remote service (similar document search, document categorization, etc.) without revealing its content. The method makes use of an external database to first select documents similar to the private document, then submits the returned similar documents to the remote service and finally collects and combines the results returned from the service constituting a proxy of the results that would have been obtained by using the private document directly. In contrast, the method and system disclosed herein retains as much detail as possible and/or necessary from the original document in order to enable humans to visualize, annotate and process the document content properly.

U.S. Pat. No. 8,812,870, issued Aug. 19, 2014, by Jean-Luc Meunier et al. and entitled "CONFIDENTIALITY PRESERVING DOCUMENT ANALYSIS SYSTEM AND METHOD" discloses a confidentiality preserving document analysis service where a document owner desires an external service to process a document without disclosing the contents of the document to the external service. The method encrypts the document content prior to sending the document to the external service, and decrypts the returned content and/or re-constructs the output document from the external service provided result. U.S. Pat. No. 8,812,870 is based on the distinction of document meta-data and document content, and assumes that the meta-data can be disclosed while the document content is encrypted. The meta-data typically consists of localization information that can be used by the remote external service to analyze the document structure without knowing and exploiting the textual content. As discussed with regard to U.S. Pat. No. 666,992, in contrast, the method and system disclosed herein is that the meta-data of the document is retained, but also as much as possible of the document content is retained in order to enable humans to annotate and process the document content which only includes publicly accessible information.

INCORPORATION BY REFERENCE

A. Gordo, F Perronnin, "DOCUMENT IMAGE REPRESENTATION, CLASSIFICATION AND RETRIEVAL IN LARGE-SCALE DOMAIN", Universitat Autonoma de Barcelona, Jan. 11, 2013, 140 pages;

F Perronnin and C. Dance, "FISHER KERNELS ON VISUAL VOCABULARIES FOR IMAGE CATEGORIZATION", 8 pages, in CVPR 2007;

U.S. Patent Publication No. 2014/0247461, published Sep. 4, 2014, by Willamowski et al. and entitled "SYSTEM AND METHOD FOR HIGHLIGHTING BARRIERS TO REDUCING PAPER USAGE";

U.S. Pat. No. 8,666,992, Issued Mar. 4, 2014, by Serrano et al., and entitled "PRIVACY PRESERVING METHOD FOR QUERYING A REMOTE PUBLIC SERVICE"; and U.S. Pat. No. 8,812,870, issued Aug. 19, 2014, by Jean-Luc Meunier et al. and entitled "CONFIDENTIALITY PRESERVING DOCUMENT ANALYSIS SYSTEM AND METHOD", are incorporated herein by reference in their entirety.

BRIEF DESCRIPTION

In one embodiment of this disclosure, described is a computer-implemented method of differential processing a print job to be printed by a printing device, the differential process generating an obfuscated version of the print job for further processing, the method comprising: a) acquiring a PDL version of the print job destined for the printing device, the PDL version of the print job including one or more of textual content and image content; and b) differential processing the PDL version of the print job to generate the obfuscated version of the print job, the differential processing obfuscating the textual content with a first differential process and obfuscating all or one or more portions of the image content with a second differential process, the first and second differential processes obfuscating all or one or more portions of the textual content and image content, respectively, such that the textual content and image content is illegible while preserving an overall shape and location of the textual content and image content.

In another embodiment of this disclosure, described is a system for differential processing a print job to be printed by a printing device, the differential process generating an obfuscated version of the print job for further processing, the system comprising: an acquiring component, the acquiring component configured to acquire a PDL version of the print job destined for the printing device, the PDL version of the print job including one or more of textual content and image content; a differential processing component, the differential processing unit configured to generate the obfuscated version of the print job, the differential processing component obfuscating all or one or more portions of the textual content with a first differential process and obfuscating all or one or more portions of the image content with a second differential process, the first and second differential process obfuscating the textual content and image content, respectively, such that the textual content and image content is illegible while preserving an overall shape and location of the textual content and image content; and a processor configured to implement the acquiring component and differential processing component.

In still another embodiment of this disclosure, described is a computer-implemented method for performing paper analytics associated with one or more printing devices, the method comprising: a) acquiring PDL versions of the print jobs destined for the one or more printing devices; b) differential processing the PDL versions of the print jobs to generate respective obfuscated versions of the print jobs, the differential processing obfuscating one or more portions of the textual content with a first differential process and obfuscating one or more portions of the image content with a second differential process, the first and second differential process obfuscating the textual content and image content, respectively, such that the textual content and image content is illegible while preserving an overall shape and location of the textual content and image content; c) accessing a categorization model to label the obfuscated versions of the print jobs or the PDL versions of the print jobs according to one or more of a plurality of categories, the categorization model based on a plurality of obfuscated versions of training print jobs which are manually labeled according to the plurality of categories; and d) generating a paper analytics report associated with one or more of the printing devices.

BRIEF DESCRIPTION OF THE DRAWINGS

FIGS. 5A and 5B are a functional block diagram of a system for analyzing task-related printing including differential processing of a print job to generate an obfuscated version of the print job according to an exemplary embodiment of this disclosure.

FIG. 7 shows an example of an original document to be obfuscated according to an exemplary embodiment of this disclosure.

DETAILED DESCRIPTION

Figure 1:
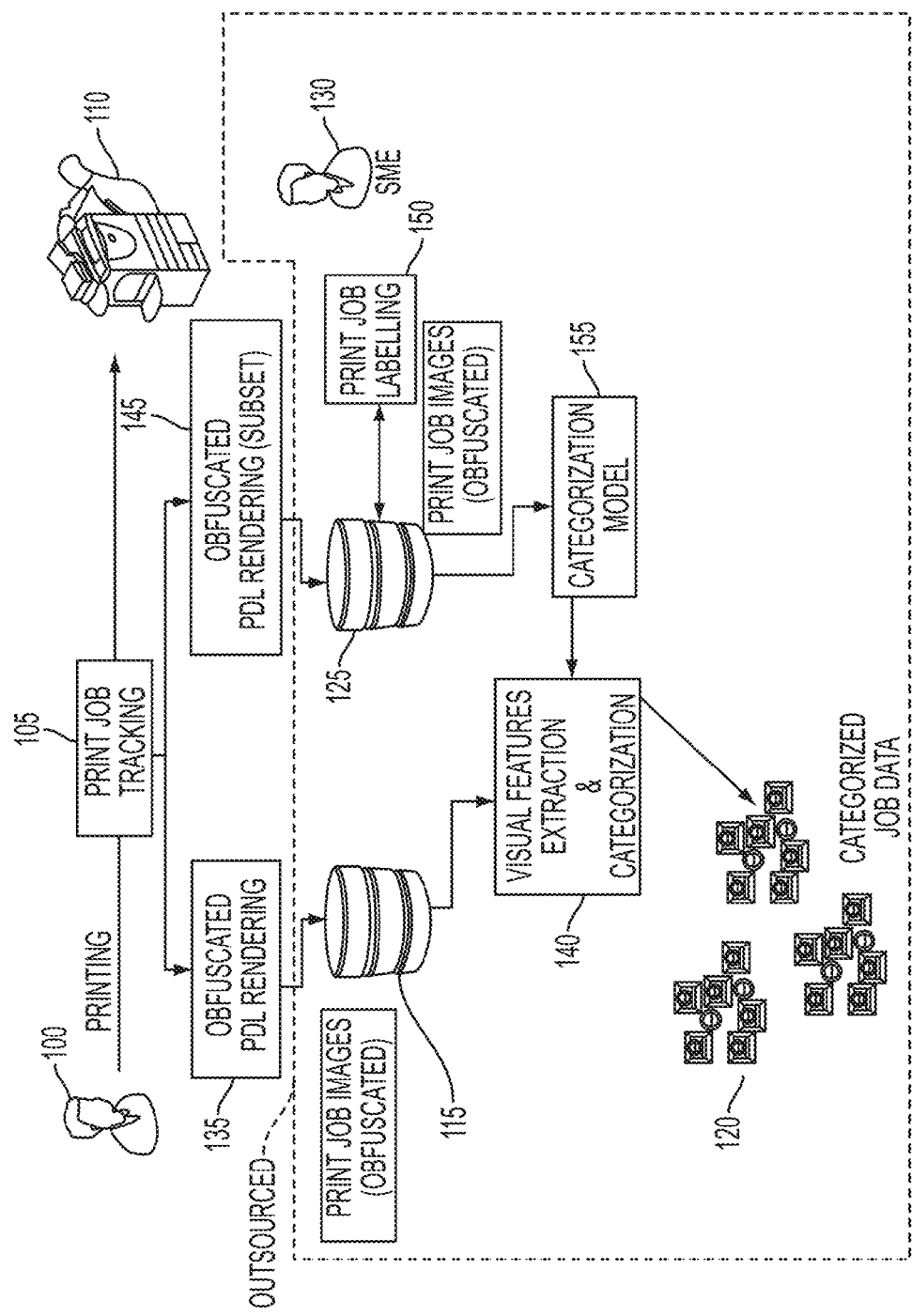
FIG. 1 is a graphical overview of a method and system for analyzing task-related printing including differential processing of a print job to generate an obfuscated version of the print job which is categorized according to an exemplary embodiment of this disclosure, where an obfuscated subset of documents is used to train a classifier, i.e., categorizer.

As briefly discussed in the background, this disclosure provides an obfuscation method and system for processing documents which protects the privacy of the documents by obfuscating their content either totally or partially, and preserves sufficient detail in the document to constitute appropriate input for one or both of automatic image analysis and human labelling, which may be provided by a third party, i.e., non-owner of the processed documents.

The disclosed obfuscation method and system includes differential processing of a PDL document content, distinguishing in particular the rendering of textual and image document content. The basic form of the method and system includes:

obfuscating textual document content by replacing each individual character in the document with some other pattern, e.g., random characters substitution; and obfuscating image content using image processing techniques, e.g., blurring.

The method and system can be further refined by:

improving image obfuscation through prior image categorization and content dependent processing of all or at least the most prominent images contained in the document, thereby (1) enabling the replacement of sensitive images, e.g., photos containing faces, using automatic face detection tools, with other similar images, see U.S. Pat. No. 8,666,992, Issued Mar. 4, 2014, by Serrano et al., and entitled "PRIVACY PRESERVING METHOD FOR QUERYING A REMOTE PUBLIC SERVICE"; and (2) recognizing images containing text for adaptive blurring or depending on the size of the detected characters, detection and replacement of textual content with random text using techniques such as in image personalization used by XMPIE, see http://www.xmpie.com.

Print devices usually accept data to be printed in form of specialized computer language fragments collectively known as PDL (Page Description Languages). These languages may have different levels of sophistication, but they all resort to a certain number of low-level graphical operations, such as 'draw image', 'draw curve', 'draw text' and so on. The print engine, i.e., the module within the print device actually in charge of 'drawing on paper', then interprets the language instructions and draws images, curves and text accordingly.

End users do not handle PDL files but handle higher-level language documents such as those generated by popular word processing applications. At the time an end user executes the printing of the document, a specialized operating system component, i.e., the printer driver, converts the document content from its high-level form to a PDL the printer can utilize. This conversion process can be monitored by specialized applications.

The disclosed obfuscation method and system intercepts the PDL generated for the printer as described above and interprets the document exactly as a printer engine. Then, all or some of the graphical operations are replaced, i.e., text drawing, image drawing, graphics drawing, so as to make the document contents illegible while preserving its overall shape and location. This obfuscated content can then be stored and/or fed to various processing and accounting modules while preserving the privacy of the document owner. Importantly, the normal, unmodified PDL content is routed to the print device as it normally would to print the document in its original non-obfuscated form.

With reference to FIG. 1, illustrated is a graphical overview of a method and system for analyzing task-related printing including differential processing of a print job to generate an obfuscated version of the print job which is categorized according to an exemplary embodiment of this disclosure, where an obfuscated subset of documents is used to train a classifier, i.e., categorizer. The exemplary method and system tracks users' print jobs to where text, image and graphical information is included in the print jobs is obfuscated at a secure site, such as the premises of the entity generating the print jobs, then the obfuscated versions of the print jobs are processed by an outsourced third-party to perform document content analytics using the obfuscated versions to generate one or more reports about the print jobs, such as the consumables they represent.

The system includes a print job tracking component 105 that intercepts print jobs that are sent by users 100 within an organization to a printing infrastructure 110 and/or which receives information on the print jobs from the printing infrastructure, such as print logs, etc. The number of print jobs is not limited but may include at least 2, or at least 5, or at least 10 and up to 100 or more users, each generating one or more print jobs for printing on the printing infrastructure 110, for example, over a selected time period, such as a day, week, month, or the like. In the exemplary embodiment, the number of print jobs may be at least 10, or at least 100, or up to 1000 or more.

An obfuscated PDL rendering component 135 generates an obfuscated version of each individual print job including one or more portions of the textual content, image content and/or graphical content obfuscated such that the layout of the print job's documents, i.e., pages, is maintained, while generating a version of the print job's documents which does not include any discernible content such as names, addresses, figures, image details, etc.

An obfuscated PDL rendering (subset) component 145 generates an obfuscated version of a subset of print jobs, which are subsequently used to train a classifier/categorization at an outsourced location.

According to the exemplary system shown in FIG. 1, an outsourced third party generates a categorization model 155 based on an obfuscated PDL rendering subset, which is used to categorize print job data associated with the obfuscated PDL renderings of the total set of print jobs.

The outsourced system includes a data memory 115 which stores the total set of obfuscated PDL renderings and a data memory 125 which stores the subset of obfuscated PDL renderings.

A print job labeling component 150 interfaces with a SME (Subject Matter Expert) 130 and data memory component 125, where the SME 130 labels the obfuscated PDL rendering subset based on the layouts of the documents, for example, an email, particular invoice format, engineering document, etc. The labeled obfuscated PDL rendering subset is stored in data memory component 125.

A categorization model generation component 155 extracts and computes for each labeled print job, a print job representation or signature including the document label. The print job signature can be a vectorial representation of information extracted from the print job. The categorization model is generated from the print job representations and associated labels to enable the categorization of other print jobs not included in the obfuscated PDL rendering subset.

A visual features extraction and categorization component 140 extracts and computes a print job representation for each individual print job associated with the total set of print jobs. As with the print job labeling process, the print job representation includes a set of feature descriptors, which may include a vectorial representation.

A categorized job data component categorizes print job data, such as identifying clusters of similar print jobs.

Figure 2A:
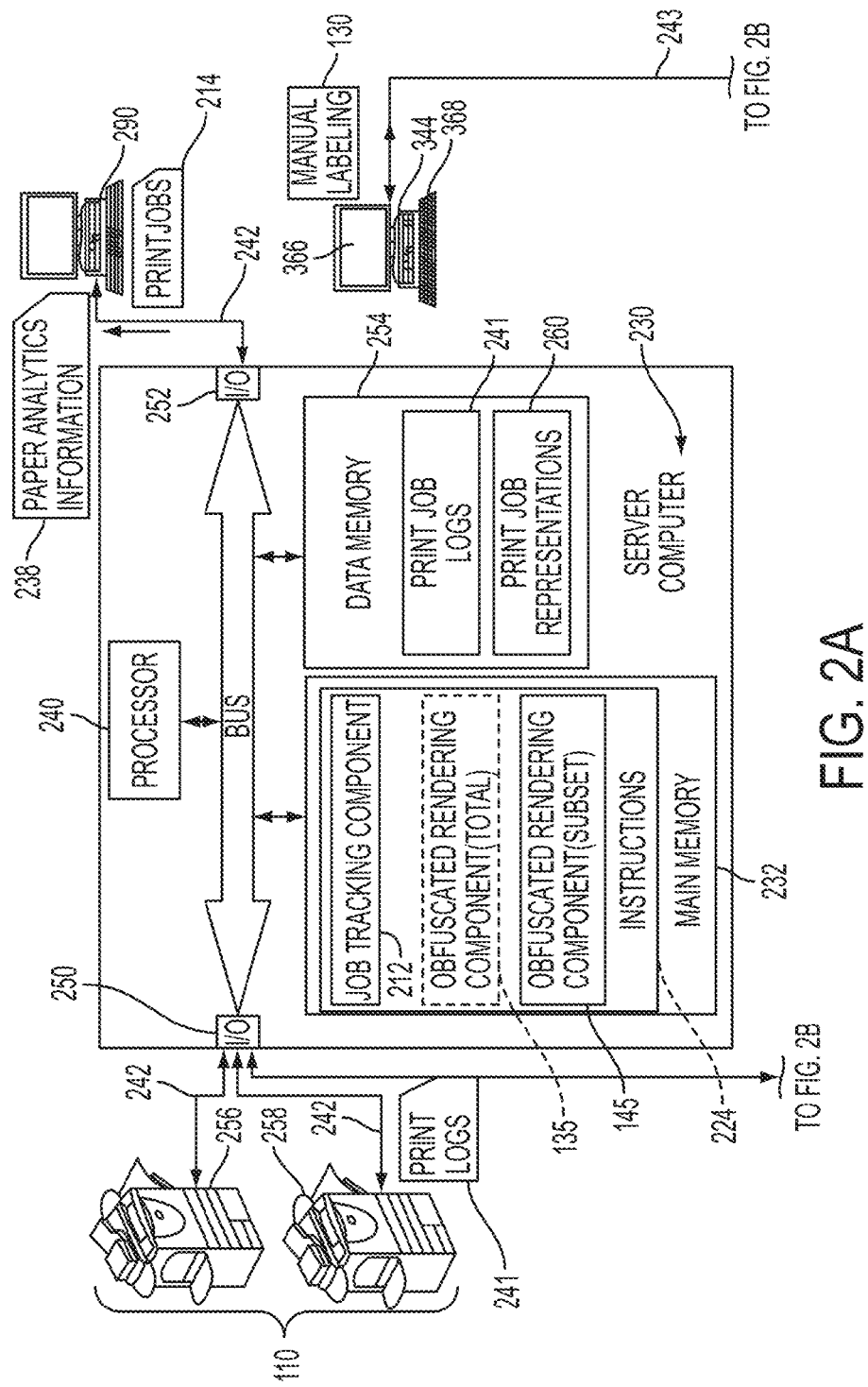
FIGS. 2A and 2B are a functional block diagram of a system for analyzing task-related printing including differential processing of a print job to generate an obfuscated version of the print job according to an exemplary embodiment of this disclosure.
Figure 2B:
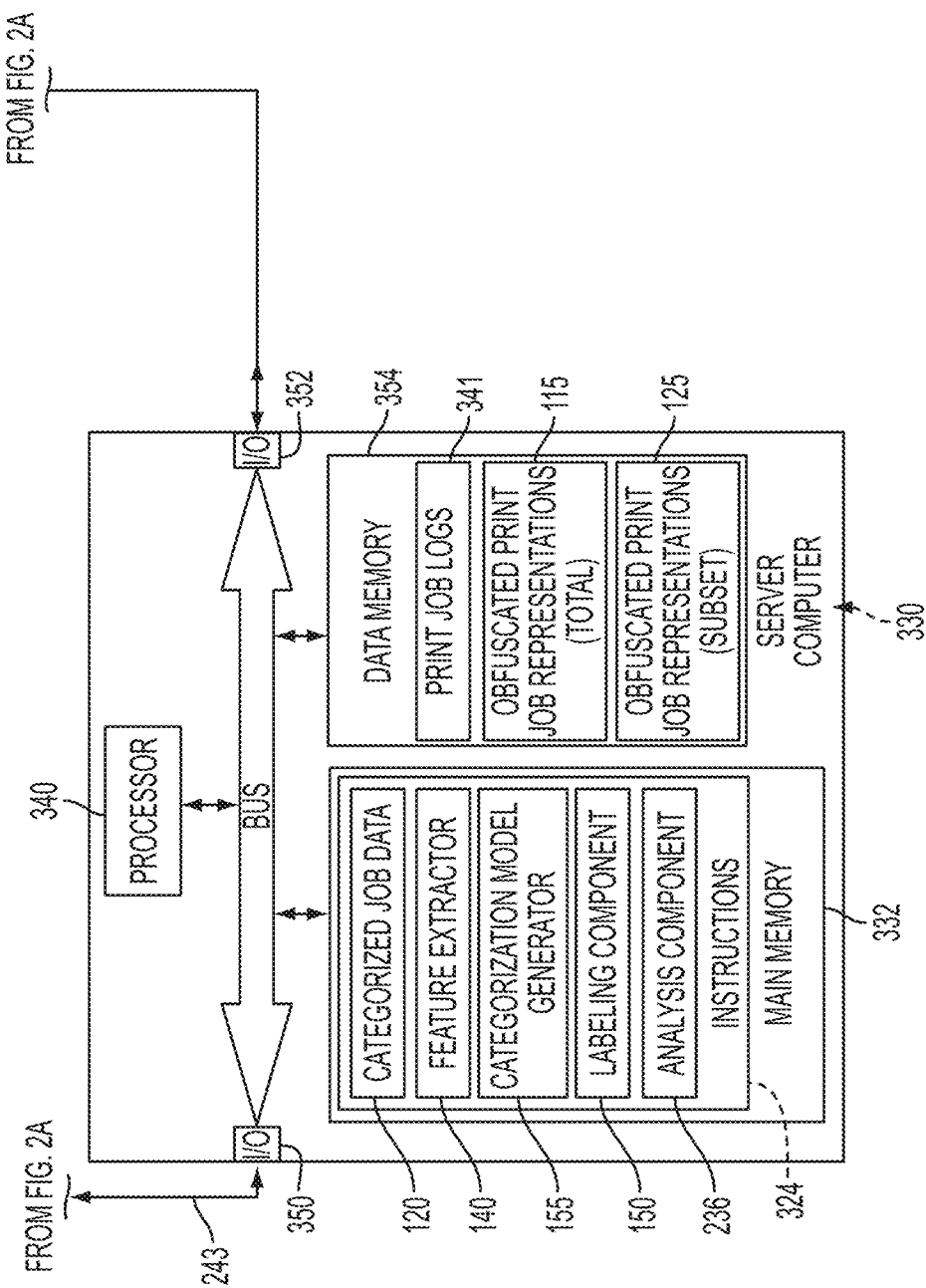

As illustrated in FIGS. 2A and 2B, the system of FIG. 1 may suitably be hosted by one or more computing devices 230 and 330. For example, the system includes an onsite server computer 230 including main memory 254 which stores instructions 224 for performing the obfuscated PDL rendering processes associated with the obfuscated PDL rendering components 135 and 145 described with reference to FIG. 1. In addition, the system includes an off-site remote server provided by an outsourced third party service provider including main memory 332 which stores instructions 324 for performing obfuscated print; job labeling categorization model generation and feature extraction and categorization as described with reference to FIG. 1, including a job tracking component 120, a feature extractor component 140, a categorization model generator component 155, a labeling component 150 and an analysis component 236. Data memory 354 stores print job logs 341, obfuscated print job representations 115 of the total set and a subset of the obfuscated print job representations 125.

In the illustrated embodiment, the computing device 230 receives print job information including print jobs 214 and/or information extracted therefrom, such as print logs 241 via a network 242. In one embodiment, the print jobs 214 are received by the job tracking component 212 from one or more client computing devices 290 linked to the network 242 that are used by respective users 100 to generate print jobs 214. However, it is to be appreciated that print job information for the submitted print jobs 214 may alternatively or additionally be received from the printing infrastructure 110 or from a print job server (not shown) which distributes the print jobs 214 to various printers 256, 258 in the printing infrastructure 110. The print job information 214 is received by the system via one or more input/output (I/O) interfaces 250, 252 and stored in data memory 254 during processing. The computing device 230 also may control the distribution of the received print jobs 24 to respective printers of the printing infrastructure 110, or this function may be performed by another computer on the network.

Computing device 330 receives obfuscated versions of the print jobs, including the total set 115 and a subset 125, over network 243 and I/O interface 350 operatively associated with computing device 230. I/O interface 352 communicates with a manual labeling device 348, including a display 366 and keyboard 368.

Computer devices 230, 290, 330 and 344 may be a PC, such as a server computer, a desktop, laptop, tablet, or palmtop computer, a portable digital assistant (PDA), a combination thereof, or other computing device(s) capable of executing instructions for performing the exemplary methods/systems.

Memory 230 and 330 may represent any type of non-transitory computer readable medium such as random access memory (RAM), read-only memory (ROM), magnetic disk or tape, optical disk, flash memory, or holographic memory. In one embodiment, memory 230 and 330 includes a combination of RAM and ROM. In some embodiments, processors 240 and memory 254 may be combined in a single chip, as well as processor 340 and memory 354. Network interfaces 250, 252, 350 and 352 allow computers 230 and 330 to communicate with other devices via a computer network 242 and 243, such as local area network (LAN) or wide area network (WAN), or the internet, and may include a modulator/demodulator (MODEM), a router, a cable, and/or Ethernet port. Memories 254 and 354 store instructions for performing the exemplary methods described as well as processed data.

Figure 3:
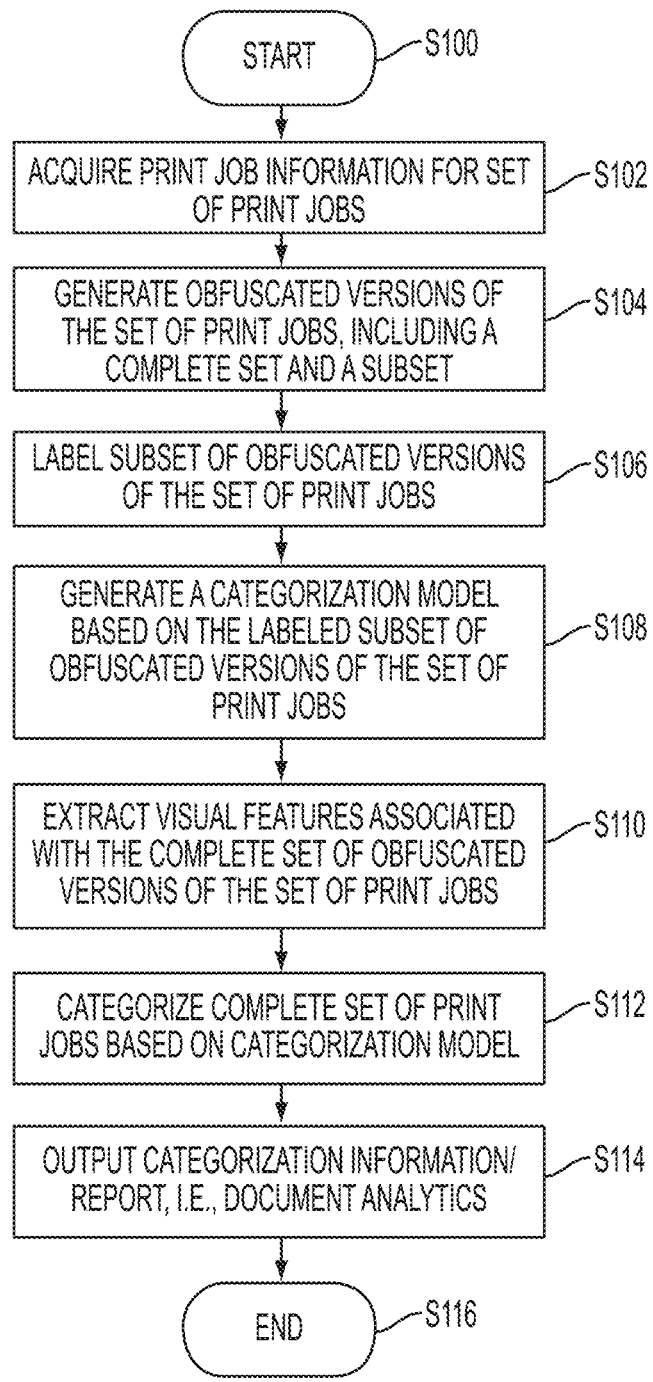
FIG. 3 is a flow chart of a method for differential processing a print job according to an exemplary embodiment of this disclosure, which can be performed with the system of FIG. 2.

With reference to FIG. 3, illustrated is a flow chart. The method begins at S100.

At S102, the method acquires print job information for set of print jobs.

At S104, the method generates obfuscated versions of the set of print jobs, including a complete set and a subset.

At S106, the method labels subset of obfuscated versions of the set of print jobs.

At S108, the method generates a categorization model based on the labeled subset of obfuscated versions of the set of print jobs.

At S110, the method extracts visual features associated with the complete set of obfuscated versions of the set of print jobs.

At S112, the method categorizes complete set of print jobs based on categorization model.

At S114, the method outputs categorization information/report, i.e., document analytics.

At S116, the method ends.

Figure 4:
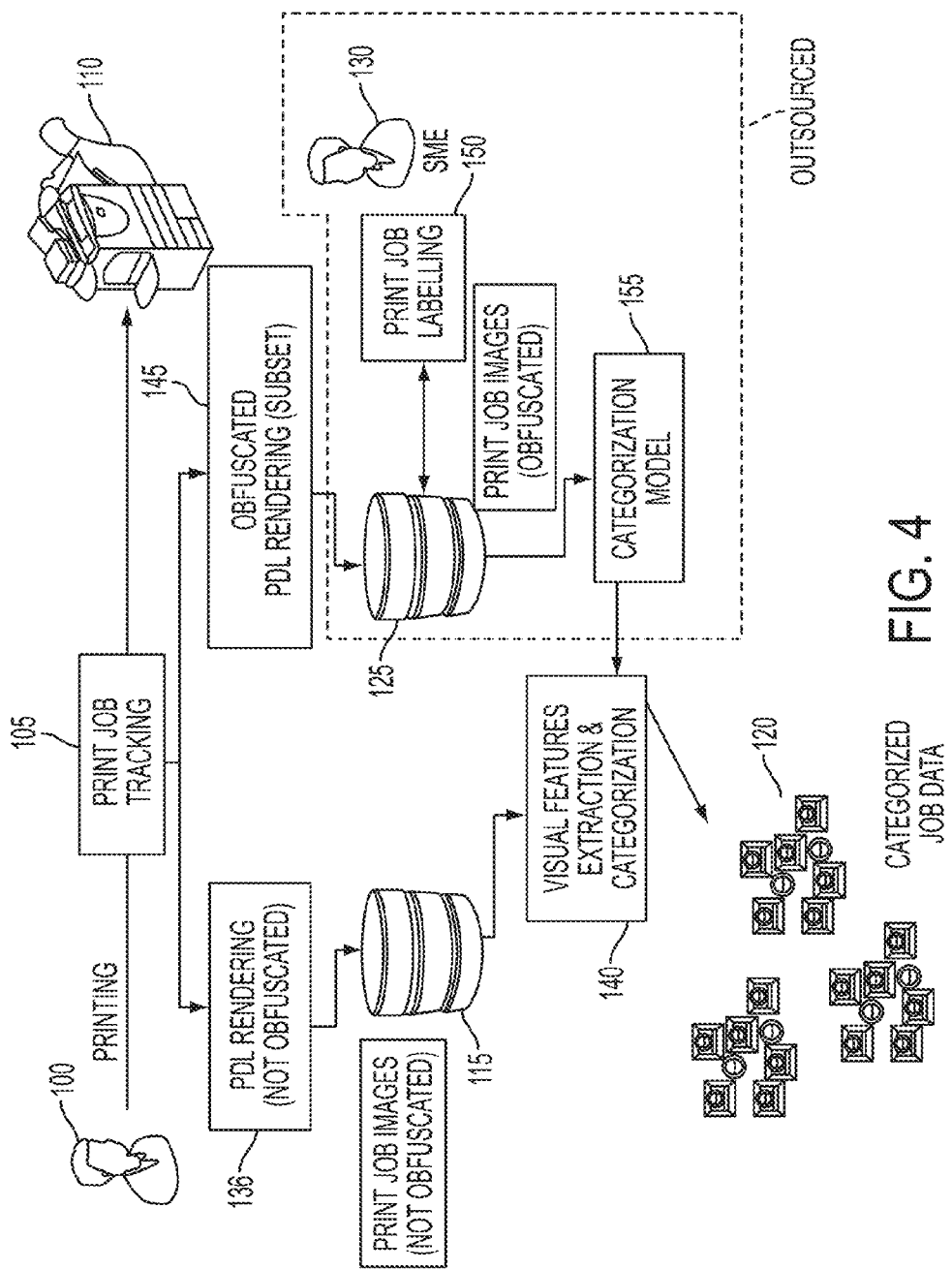
FIG. 4 is a graphical overview of another method and system for analyzing task-related printing including differential processing of a print job to generate an obfuscated subset of documents used to train a classifier, i.e., categorized, where a non-obfuscated version of the print job is processed to categorize the print job.

With reference to FIG. 4, illustrated is a graphical overview of another method and system for analyzing task-related printing including differential processing of a print job to generate an obfuscated subset of documents used to train a classifier, i.e., categorized, where a non-obfuscated version of the print job is processed to categorize the print job. The exemplary method and system outsources the generation of the categorization model 155 using a subset of obfuscated versions of a set of tracked print jobs 105. As shown, non-obfuscated PDL renderings of the print jobs, retained at a secure site, are categorized using the outsourced generated categorization model. According to this exemplary method and system, a complete set of obfuscated versions of the print jobs are not required and non-obfuscated versions of the print jobs are categorized, in contrast to the method and systems described with reference to FIGS. 1-3, which require a complete set of obfuscated versions of the print jobs and categorization is based on the obfuscated versions of the print jobs.

The system includes a print job tracking component 105 that intercepts print jobs that are sent by users 100 within an organization to a printing infrastructure 110 and/or which receives information on the print jobs from the printing infrastructure, such as print logs, etc. The number of print jobs is not limited but may include at least 2, or at least 5, or at least 10 and up to 100 or more users, each generating one or more print jobs for printing on the printing infrastructure 110, for example, over a selected time period, such as a day, week, month, or the like. In the exemplary embodiment, the number of print jobs may be at least 10, or at least 100, or up to 1000 or more.

A PDL rendering component 1365 stores non-obfuscated versions of each individual print job including one or more portions of the textual content.

An obfuscated PDL rendering (subset) component 145 generates an obfuscated version of a subset of print jobs, which are subsequently used to train a classifier/categorization at an outsourced location.

According to the exemplary system shown in FIG. 4, an outsourced third party generates a categorization model 155 based on an obfuscated PDL rendering subset, which is used to categorize print job data associated with the non-obfuscated PDL renderings of the total set of print jobs.

The outsourced system includes a data memory 125 which stores the subset of obfuscated PDL renderings.

A print job labeling component 150 interfaces with a SME (Subject Matter Expert) 130 and data memory component 125, where the SME 130 labels the obfuscated PDL rendering subset based on the layouts of the documents, for example, an email, particular invoice format, engineering document, etc. The labeled obfuscated PDL rendering subset is stored in data memory component 125.

A categorization model generation component 155 extracts and computes for each labeled print job, a print job representation or signature including the document label. The print job signature can be a vectorial representation of information extracted from the print job. The categorization model is generated from the obfuscated print job representations and associated labels to enable the categorization of other non-obfuscated print jobs at a secure site, separate from the outsourced location.

At the secure site, i.e., customer site, a visual features extraction and categorization component 140 extracts and computes a print job representation for each individual print job associated with the total set of non-obfuscated print jobs. As with the print job labeling process, the print job representation includes a set of feature descriptors, which may include a vectorial representation.

A categorized job data component categorizes print job data, such as identifying clusters of similar print jobs.

Figure 5A:
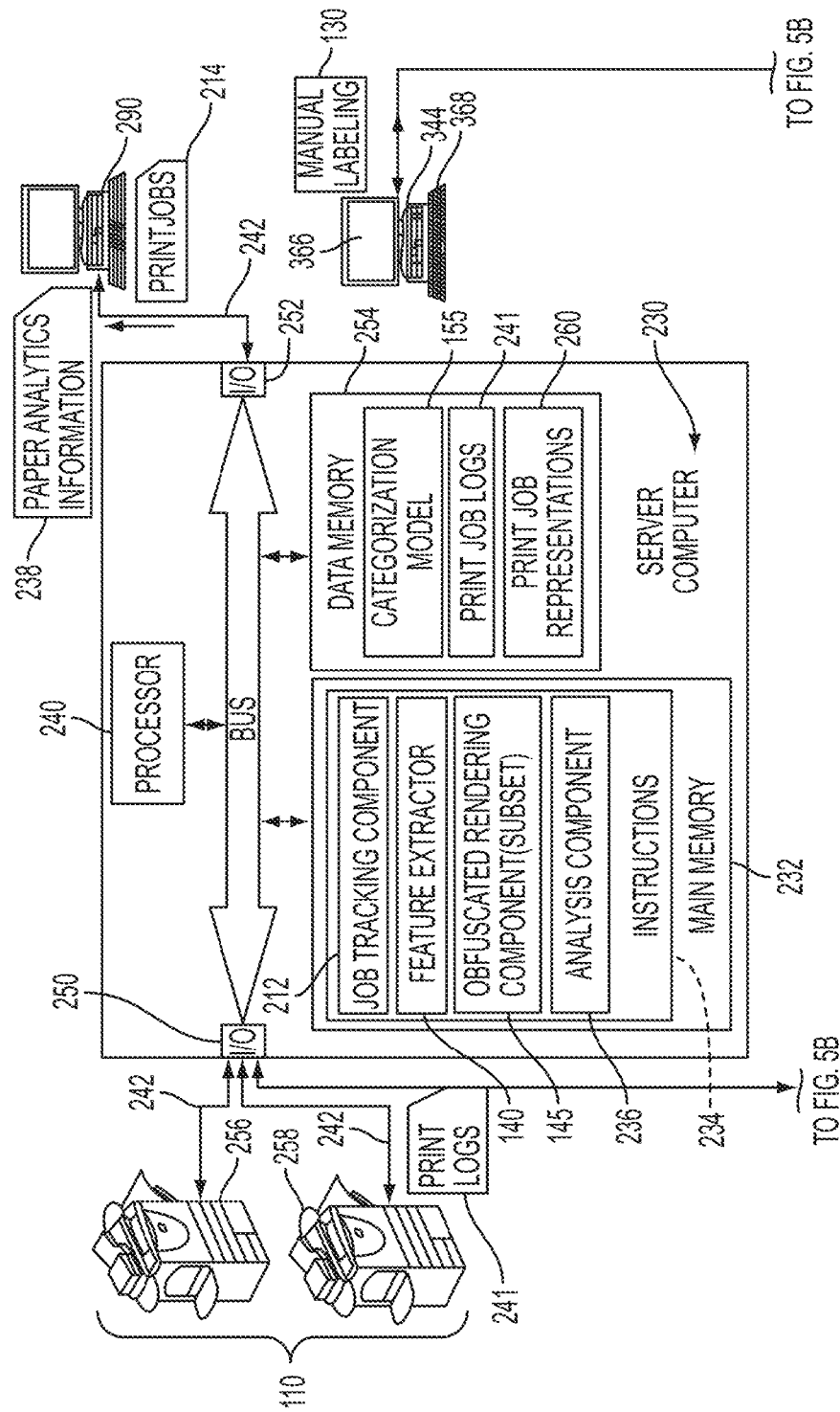

FIGS. 5A and 5B illustrate a functional block diagram of a system for analyzing task-related printing including differential processing of a print job to generate an obfuscated version of the print job according to an exemplary embodiment of this disclosure.

As illustrated in FIG. 5, the system of FIG. 4 may suitably be hosted by one or more computing devices 230 and 330. For example, the system includes an onsite server computer 230 including main memory 254 which stores instructions 224 for performing the obfuscated PDL rendering processes associated with the obfuscated PDL rendering component 145 described with reference to FIG. 4. In addition, the system includes an off-site remote server provided by an outsourced third party service provider including main memory 332 which stores instructions 324 for performing obfuscated print job labeling and categorization model generation as described with reference to FIG. 1, including a job tracking component 120, a feature extractor component 140, a categorization model generator component 155, and a labeling component 150. Data memory 354 stores print job logs 341, obfuscated print job representations 115 of a subset of the obfuscated print job representations 125.

In the illustrated embodiment, the computing device 230 receives print job information including print jobs 214 and/or information extracted therefrom, such as print logs 241 via a network 242. In one embodiment, the print jobs 214 are received by the job tracking component 212 from one or more client computing devices 290 linked to the network 242 that are used by respective users 100 to generate print jobs 214. However, it is to be appreciated that print job information for the submitted print jobs 214 may alternatively or additionally be received from the printing infrastructure 110 or from a print job server (not shown) which distributes the print jobs 214 to various printers 256, 258 in the printing infrastructure 110. The print job information 214 is received by the system via one or more input/output (I/O) interfaces 250, 252 and stored in data memory 254 during processing. The computing device 230 also may control the distribution of the received print jobs 24 to respective printers of the printing infrastructure 110, or this function may be performed by another computer on the network.

Computing device 330 receives obfuscated versions of the print jobs, including a subset 125, over network 243 and I/O interface 350 operatively associated with computing device 230. I/O interface 352 communicates with a manual labeling device 348, including a display 366 and keyboard 368.

Figure 6:
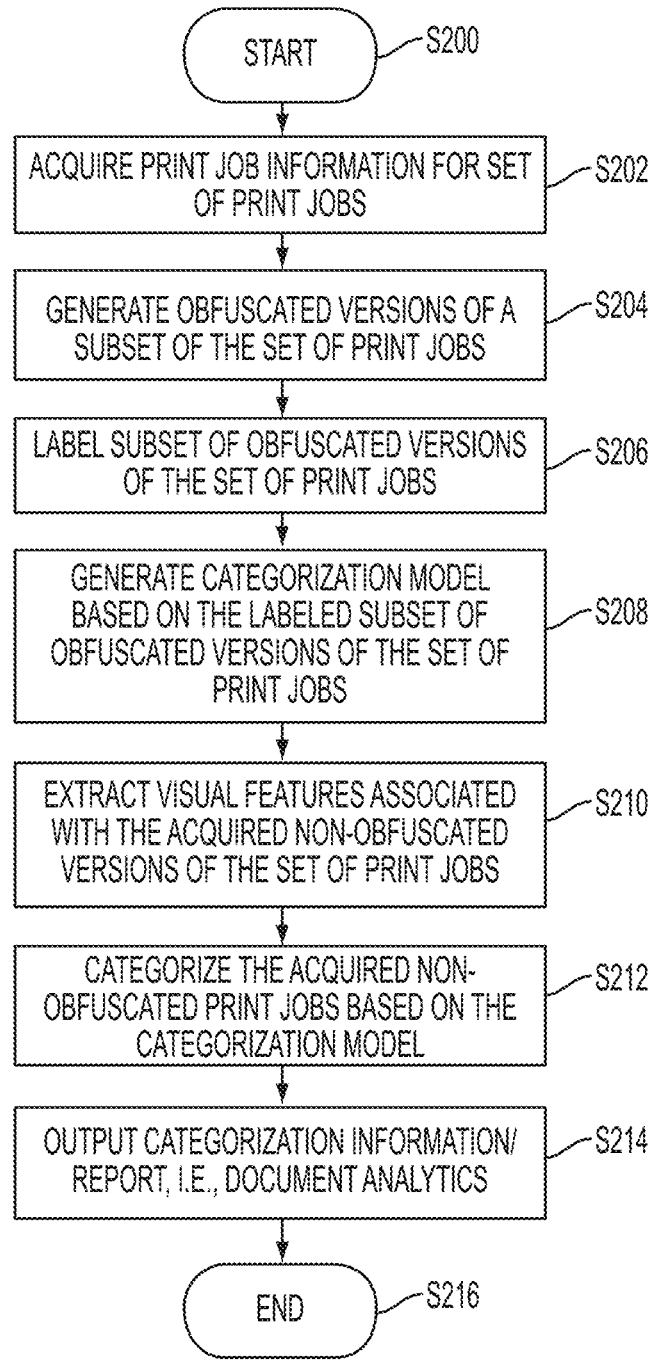
FIG. 6 is a flow chart of a method for differential processing a print job according to an exemplary embodiment of this disclosure, which can be performed with the system of FIG. 5.

With reference to FIG. 6, illustrated is a flow chart of a method for differential processing a print job according to an exemplary embodiment of this disclosure, which can be performed with the system of FIG. 5.

The method begins at S200.

At S202, the method acquires print job information for set of print jobs.

At S204, the method generates obfuscated versions of a subset of the set of print jobs.

At S206, the method labels subset of obfuscated versions of the set of print jobs.

At S208, the method generates categorization model based on the labeled subset of obfuscated versions of the set of print jobs.

At S210, the method extracts visual features associated with the acquired non-obfuscated versions of the set of print jobs.

At S212, the method categorizes the acquired non-obfuscated print jobs based on the categorization model.

At S214, the method outputs categorization information/report, i.e., document analysis.

At S216, the method ends.

While the exemplary embodiments described above with reference to FIG. 1-FIG. 6 include a categorization model 155 generated by processing obfuscated versions of a subset of print jobs to be printed, the categorization model 155 can also be generated, i.e., trained, using a set of other print jobs or document digital representations. For example, a set of obfuscated documents may be acquired at a timestamp X and sent to SME 130 where the obfuscated documents are labeled and the categorization model 155 is trained, which may take days, weeks, or longer. Subsequently, the trained categorization model 155 is integrated within the local environment of an organization at timestamp X+d and the print jobs generated from this moment are categorized and analytics based on the categorized print jobs are performed and reported.

With reference to FIG. 7, illustrated is an example of an original document to be obfuscated according to an exemplary embodiment of this disclosure.

Figure 8:
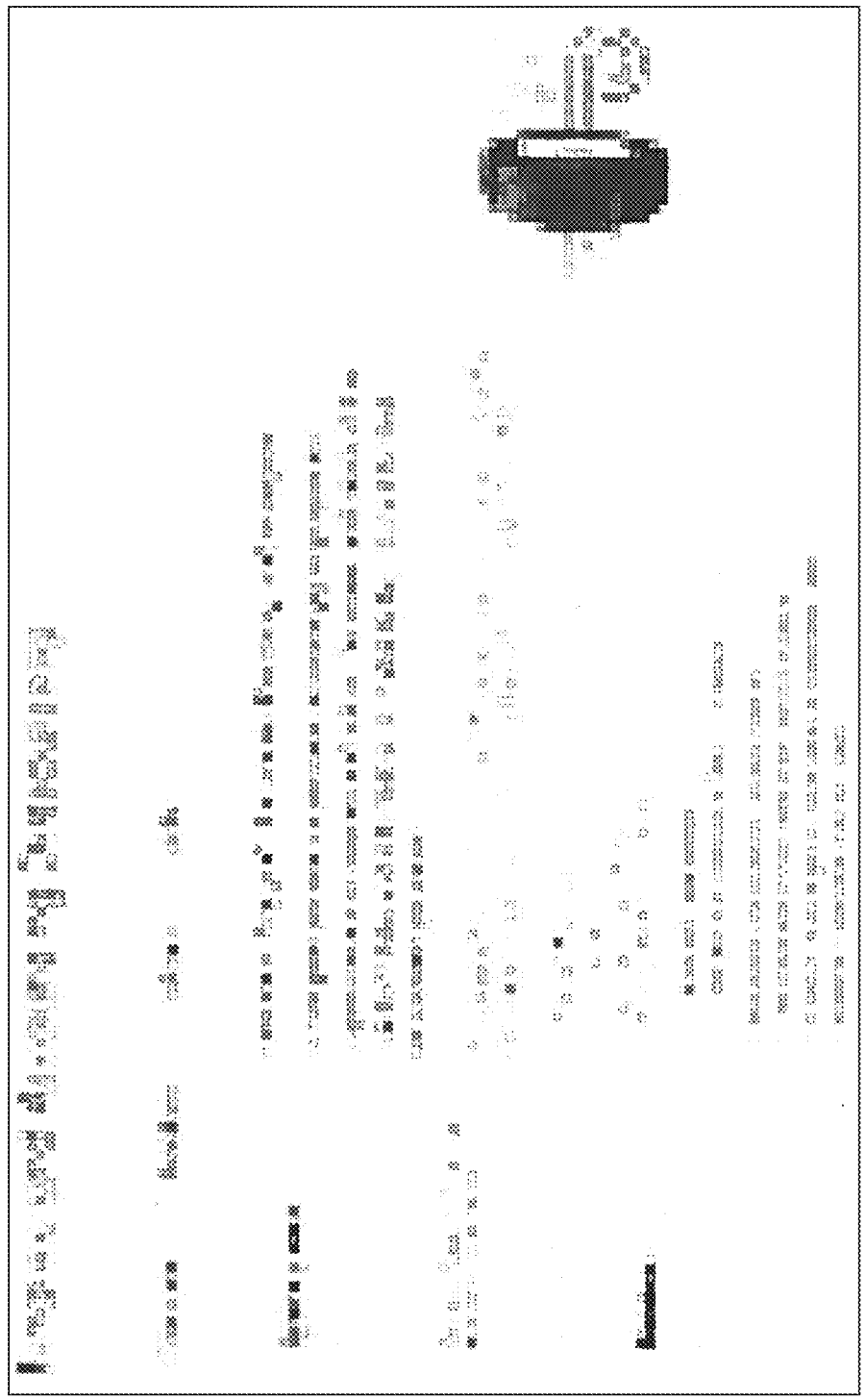
FIG. 8 shows an example of the original document shown in FIG. 7 processed according to a thumbnailing method, i.e., global page blurring method.

With reference to FIG. 8, illustrated is an example of the original document shown in FIG. 7 processed according to a thumbnailing method, i.e., global page blurring method.

Figure 9:
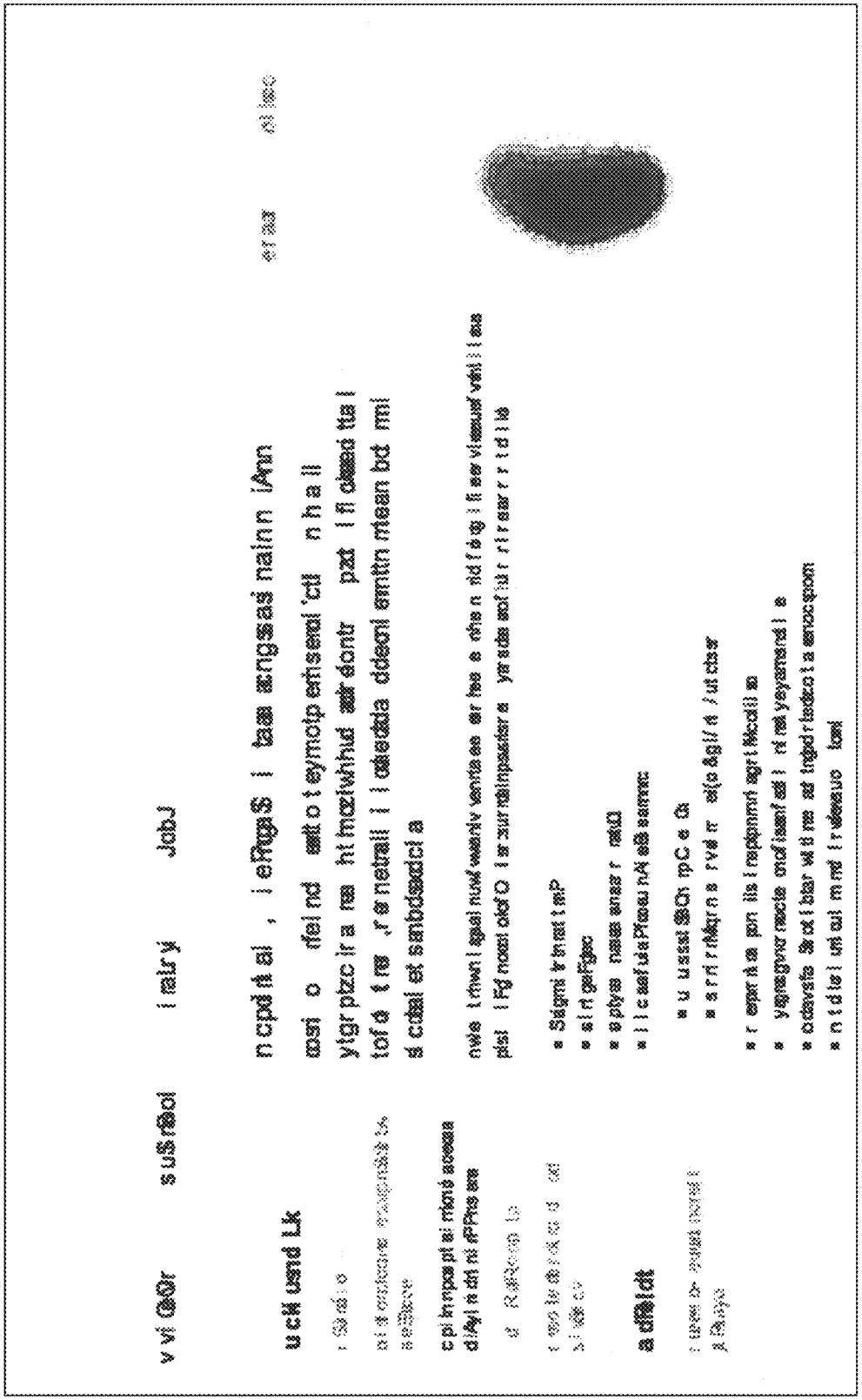
FIG. 9 shows an example of the original document shown in FIG. 7 processed according to an obfuscation method according to an exemplary embodiment of this disclosure.

With reference to FIG. 9 illustrated is an example of the original document shown in FIG. 7 processed according to an obfuscation method according to an exemplary embodiment of this disclosure.

Various aspects of the method and system are now described in greater detail:

Text Obfuscation. (135, 136, 145, S104, S204)

According to an exemplary embodiment of this disclosure, the method/system replaces characters with randomly chosen characters using an identical or similar font, thereby allowing the text to be illegible, while taking approximately the same space on the page.

In another exemplary embodiment, the method/system replaces characters by randomly chosen points roughly contained within the confines of a character bounding box.

In another exemplary embodiment, the source or a replacement character is blurred so as to make it illegible while fitting approximately the same bounding box.

The net result of all the character replacement methods is to obtain an illegible, even statistically-illegible, text, since replacement characters are chosen randomly, while roughly preserving the overall visual aspect of a document.

Various obfuscation schemes allows for fine-tuning of the result, which may be used, for example, for further automated document processing or simply providing a more visually aesthetic version to the eye of users in charge of analyzing and labelling the anonymized version of printed documents.

Image Obfuscation. (135, 136, 145, S104, S204)

As in the case for text obfuscation, several schemes can be used to render images. For example, size-adaptive blurring, where a blur factor depends on a rendered image size, pixel randomization, replacement with a fixed pattern, etc.

Graphics Obfuscation. (135, 136, 145, S104, S204)

As in the case of text obfuscation, several schemes can be used to render graphics. According to an exemplary embodiment of the method/system, a bounding box of a given graphics path is replace by a fixed pattern within the bounding box. In another exemplary embodiment, points are randomly replaced by other values while staying roughly in the confines of a graphics bounding box.

Extended Operations. (135, 136, 145, S104, S204)

As described above, it is possible to go further than these atomic graphics operations by making use of area-specific and conditional obfuscation schemes.

According to one exemplary embodiment of the method and system, obfuscation is triggered only for particular portions of a PDL, e.g., for those that result in drawing within specified document page areas. One of the advantages of such a "partial obfuscation" is that the text corresponding to the non-anonymized parts can then be exploited to facilitate both automatic content analysis and human labelling processing. Furthermore, often the "personal, private" portion, e.g. areas typically corresponding to address fields location, are less indicative about the document class that the non-anonymized parts. For example, one possibility is for a customer to specify a set of sensitive locations within their documents, such as top right corner within a bounding box predefined size or automatically detected, top half of the first page, the first N lines or only the last page, etc.

According to another exemplary embodiment, the process is further refined by applying different obfuscation schemes to different areas of a document page. For example, an address area always positioned at a consistent location on a page can be obfuscated by replacing characters while footnotes at the bottom of a page can be fully blurred or removed.

The disclosed obfuscation method and system was compared with a baseline thumbnail "obfuscation" method, including the creation of thumbnails of individual document page images. In other words, each page was blurred. This comparison was first performed from a human labeler's perspective, and then from a machine perspective. For the first case, it was demonstrated that the disclosed obfuscation method and system provides more appropriate visual input documents for human labelling whereas in the machine perspective case the automatic content analysis results obtained are evaluated with both methods.

Human Labeler's Perspective.

The comparison of the disclosed obfuscation method and system with a thumbnailing method, i.e., global page blur, from a human labeler's perspective yields the following observations.

Since the disclosed obfuscations method and system replaces every letter, diversity of font size can be maintained for a page without the content of the page, i.e., text, being recognizable. The thumbnail approach, by blurring the entire page at once, can leave large fonts readable, in the case where the thumbnail is not small enough, or make small fonts invisible, in the case where the thumbnail is too small.

Document types are simpler to recognize on pages where letters are changed compared to the thumbnail effect.

Patterns and shapes are easier to recognize by a human when text has the same size and position as the original text as compared to the thumbnail approach where areas are mixed together.

Machine perspective.

From a machine perspective, first represented is each document page using either Run Lengths (RL) Vectors or Fisher Vectors (FV) representation or both and combined them. See A. Gordo, F Perronnin, "Document Image Representation, Classification and Retrieval in Large-Scale Domain", Universitat Autonoma de Barcelona, Jan. 11, 2013, 140 pages and F Perronnin and C. Dance, "Fisher Kernels on visual vocabularies for image categorization", 8 pages, in CVPR 2007. Then for each document, a single RL or FV representation was computed by averaging the page signatures as follows:

$$Doc = \frac{1}{w_f + \sum_{j=2}^{nP-1} w_c + w_l} \left( w_f S_{FP} + \sum_{j=2}^{nP-1} w_c S_{CP} + w_l S_{LP} \right)$$

where the set of values (wf, wc, wl) refer to the weights given to the first page (FP), content page (CP) and last page (LP), while SFP, SCP and SLP refer to the corresponding RL or FV signature. It was found that the two best options for the weights were (1,0,0) which are referred to as first page strategy (as only the first page is considered) and (8,1,1) where a more important weight is assigned to the first page and much less weight to the remaining pages.

The categorizer performance achieved with both obfuscation methods was compared using two scenarios, where, the obfuscation method disclosed herein is referenced "PDL Anon" and the baseline thumbnail obfuscation referenced as "Thumb".

Scenario 1. Training and running a classifier on an anonymized document corresponding to the case of an outsourced manual labelling and outsourced document classification as shown in FIG. 1. In other words, anonymized documents are used to train the classifiers and during run time the anonymized documents are also used to predict a document label, i.e., class. In addition and for comparison purposes, shown are classification results that would be obtained if the original non-obfuscated documents are used both to train the classifier and to predict the labels at run/test time. Note however that this is simply an upper bound on the results and corresponds to the impossible/non-desired scenario where the documents are annotated by their owners and where the document content analytics module runs at a customer site. Results are shown in Table 1 and 2 below.

Scenario 2. Training a classifier on anonymized documents and running the classifiers on the original documents corresponding to the case of outsourced manual labelling and internal document classification as shown in FIG. 4. In other words, obfuscated documents are used to train the classifiers but during run time the classifier is running on at a customer's site so that the original documents are used to predict the document label, i.e., class. One advantage associated with classifying the original documents directly is avoiding any extra cost associated with the print workflow due to the obfuscation process. Results are shown in Tables 3 and 4 below.

For each of the scenarios, two basic categorizers were tested:

NCM (nearest class mean) corresponding to a "template" or "prototype" based categorization where each class is represented through its average signature. During classification each new document is assigned to the class with the closest mean (template, prototype). Results are shown in Table 1 and 3 below.

SGD (stochastic gradient based) classification where a linear classifier was trained on the training data optimizing a hinge loss and tuned to the parameters on a validation set. Results are shown in Tables 2 and 4 below.

In both cases, the data in training and test set was randomly split five times for the NCM respectively training, test and validation for the SGD. Tables 1-4 report average results and standard deviation. Note that high variations between different splits are due to the fact that only a small dataset (855 documents) was used; some of the classes had very few examples that were uniformly distributed within training, validation and test set, so in some cases the classifier was trained with only two to three training examples which provided rather poor performance on those classes due to insufficient training data compared to other ones. Nevertheless, for fair a comparison the same exact splits were used to compare different configurations and different obfuscation methods.

TABLE 1

| NCM | (1, 0, 0) | | | (8, 1, 1) | | |
|---|---|---|---|---|---|---|
| | RL | FV | RL + FV | RL | FV | RL + FV |
| Orig | 63.7 ± 1 | 77.1 ± 3.4 | 80.8 ± 2.1 | 63.7 ± 2.5 | 79.1 ± 3.1 | 80.3 ± 1.8 |
| Thumb | 66 ± 2.9 | 65.9 ± 3.7 | 68.9 ± 3.4 | 65 ± 3.1 | 67.7 ± 3.7 | 70.4 ± 3.5 |
| PDL Anon | 57.8 ± 1.2 | 67.7 ± 2.5 | 68.5 ± 3.5 | 58.6 ± 1.3 | 69.6 ± 2.1 | 70.1 ± 3.7 |

TABLE 2

| SGD | (1, 0, 0) | | | (8, 1, 1) | | |
|---|---|---|---|---|---|---|
| | RL | FV | RL + FV | RL | FV | RL + FV |
| Orig | 79.7 ± 1.5 | 83.2 ± 2 | 84.5 ± 1.6 | 80.8 ± 1.3 | 83.3 ± 1.7 | 84.4 ± 1.9 |
| Thumb | 78.3 ± 2.1 | 82 ± 3.6 | 83.1 ± 1.7 | 79 ± 2.2 | 83 ± 2.8 | 84.1 ± 3.5 |
| PDL Anon | 77.6 ± 2.7 | 79.7 ± 1.2 | 81.2 ± 1.5 | 77.6 ± 2.5 | 79.5 ± 1.8 | 81.1 ± 1.9 |

In the first scenario corresponding to FIG. 1, where the training and test set both used anonymized documents, or in both cases original documents, observations included:

The NCM based classifier (see Table 1) obtained slightly worse classification results for PDL anonymized and thumbnails that used original documents except when the RL signatures were used, in which case the thumbnails sometimes worked better. Comparing thumbnails with PDL anonymized documents, RL signatures NCM performs better on thumbnails, FV on PDL anonymized documents and when the results were merged with both representations the performances are more similar.

The SGD provided results with both the thumbnails and PDL anonymized documents much closer to the results obtained with the original documents using any of the mentioned features. The results obtained with thumbnails are slightly better than the ones obtained with PDL anonymized documents.

TABLE 3

| NCM | (1, 0, 0) | | | (8, 1, 1) | | |
|---|---|---|---|---|---|---|
| | RL | FV | RL + FV | RL | FV | RL + FV |
| Thumb | 30.4 ± 2.3 | 24.9 ± 2.7 | 26.3 ± 1.7 | 30.5 ± 2.4 | 25.1 ± 2.4 | 27.1 ± 1.8 |
| PDL Anon | 56.9 ± 0.7 | 66.5 ± 1.4 | 69.6 ± 2.7 | 56.7 ± 0.7 | 69.6 ± 2.1 | 70.9 ± 2.8 |

TABLE 4

| SGD | (1, 0, 0) | | | (8, 1, 1) | | |
|---|---|---|---|---|---|---|
| | RL | FV | RL + FV | RL | FV | RL + FV |
| Thumb | 57 ± 4.7 | 38.1 ± 4.7 | 56.3 ± 6 | 57.7 ± 3.7 | 38 ± 4.1 | 57.4 ± 5.2 |
| PDL Anon | 74.9 ± 2.2 | 75.6 ± 2.3 | 78.3 ± 1.6 | 75.9 ± 2.4 | 75.9 ± 1.9 | 78.3 ± 1.7 |

In the second scenario corresponding to FIG. 4, the training is performed on a pre-processed document set (thumbnails or PDL Anon) and the resulting classifier is directly tested on the original documents to avoid the extra cost of anonymizing the documents. For this configuration, observations included:

Both NCM (Table 3) and SGD (Table 4) the results for the original documents obtained when the system was trained using the PDL anonymized documents were far above the results achieved when the classifiers on thumbnails were trained, and this was independent of the features used. The main reason is that perceptually the PDL anonymized documents are much more similar to the original documents than the rescaled thumbnails and therefore the extracted features are more similar, i.e., closer in the feature space, In other words, a classifier trained on the features extracted on PDL anonymized documents is still able to categorize the original documents in contrast to the classifier learnt on the thumbnails which cannot.

The PDL obfuscation method and system disclosed herein can provide several advantages compared to thumbnailing. For example, it allows adapting an obfuscation technique to a document content, whereas naive thumbnailing corresponds to blurring a whole document content with a standard, unique blurring factor and may thus fail to anonymize text with big font sizes. In addition, the method and system disclosed herein enables correct obfuscation by replacing characters in a text by any other glyph.

Another advantage includes zone dependent obfuscation, where a system can further refine a previous method by applying different obfuscation schemes, including no obfuscation, to different areas of a document, e.g., address box, user defined region, etc.

Still another advantage includes keeping finer grained document content for later processing. This facilitates a posteriori automatic pattern recognition and manual document labelling based on the visual document page images, where labelling can be performed not only by a document owner, but also by a Subject Matter Expert because the content is obfuscated.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for classifying a plurality of print jobs to be printed by one or more printing devices the method comprising:
    a) acquiring non-obfuscated PDL versions of the plurality of print jobs destined for the one or more printing devices, the PDL versions of the print jobs including one or more of non-obfuscated textual content and image content;
    b) differential processing the non-obfuscated PDL versions of the print jobs to generate obfuscated versions of the print jobs, the differential processing obfuscating the textual content with a first differential process and obfuscating one or more portions of the image content with a second differential process, the first and second differential processes obfuscating one or more portions of the textual content and image content, respectively, such that the textual content and image content is illegible while preserving an overall shape and location of the textual content and image content;
    c) manually labeling one or more of the obfuscated versions of the plurality of print jobs according to one or more of a plurality of document type categories, the categories associated with the overall shape and location of the obfuscated textual content and the obfuscated image content;
    d) training a classifier using some or all of the manually labeled obfuscated versions of the plurality of print jobs; and
    e) accessing the trained classifier to classify one or more of the obfuscated versions of the plurality of print jobs or classify one or more of the non-obfuscated PDL versions of the plurality of print jobs, each print job classified as one or more of the plurality of document type categories.

2. The method of differential processing a print job according to claim 1, wherein the categories include one or more of emails, tables, reports, letters, forms, and articles.

3. The method of differential processing a print job according to claim 1, wherein steps a) and b) are performed at a location associated with the printing device and steps c)-e) are performed by a third-party at a location remote from the printing device.

4. The method of differential processing a print job according to claim 1, wherein the first differential process replaces a plurality of textual characters with random characters.

5. The method of differential processing a print job according to claim 1, wherein the second differential process performs one or more of blurring, size-adaptive blurring, pixel randomization and replacement of the image content with a fixed pattern.

6. An image processing system comprising memory storing instructions for performing the computer-implemented method of differential processing a print job to be printed by a printing device according to claim 1, and a processor operatively communicating with the memory which executes the instructions.

7. A system for classifying a plurality of print jobs to be printed by one or more printing devices, the system comprising:
    an acquiring component, the acquiring component configured to acquire non-obfuscated PDL versions of the plurality of print jobs destined for the one or more printing devices, the PDL versions of the print jobs including one or more of non-obfuscated textual content and non-obfuscated image content;
    a differential processing component, the differential processing unit configured to generate obfuscated versions of the plurality of print jobs, the differential processing component obfuscating one or more portions of the textual content with a first differential process and obfuscating one or more portions of the image content with a second differential process, the first and second differential process obfuscating the textual content and image content, respectively, such that the textual content and image content is illegible while preserving an overall shape and location of the textual content and image content;
    a labeling component, the labeling component configured to manually label one or more of the obfuscated versions of the print job according to one of a plurality of document type categories, the categories associated with the overall shape and location of the obfuscated textual content and the obfuscated image content;
    a classifier component, the classifier component configured to be trained using manually labeled obfuscated versions of print jobs provided by the labeling component, and configured to classify one or more of the obfuscated versions of the plurality of print jobs or classify one or more of the non-obfuscated PDL versions of the plurality of print jobs, each print job classified as one or more of the plurality of document type categories; and
    a processor configured to implement the acquiring component, differential processing component, labeling component and classifier component.

8. The system for differential processing a print job according to claim 7, wherein the categories include one or more of emails, tables, reports, letters, forms and articles.

9. The system for differential processing a print job according to claim 7, wherein the first differential process replaces a plurality of textual characters with random characters.

10. The system for differential processing a print job according to claim 7, wherein the second differential process performs one or more of blurring, size-adaptive blurring, pixel randomization and replacement of the image content with a fixed pattern.

11. The system for differential processing a print job according to claim 7, wherein the classifier component is trained using a plurality of obfuscated versions of training print jobs generated by the differential processing component, the training print jobs including one or more of the PDL version of the print job destined for the printing device and other PDL print jobs.

12. A computer-implemented method for performing paper analytics associated with a plurality of print jobs printed with one or more printing devices, the method comprising:

a) acquiring PDL versions of the print jobs destined for the one or more printing devices;

b) differential processing the PDL versions of the print jobs to generate respective obfuscated versions of the print jobs, the differential processing obfuscating one or more portions of the textual content with a first differential process and obfuscating one or more portions of the image content with a second differential process, the first and second differential process obfuscating the textual content and image content, respectively, such that the textual content and image content is illegible while preserving an overall shape and location of the textual content and image content;

c) accessing a classifier to automatically label the obfuscated versions of the print jobs or the PDL versions of the print jobs according to one or more of a plurality of document type categories, the classifier trained using a plurality of obfuscated versions of training print jobs which are manually labeled according to the plurality of document type categories; and d) generating a paper analytics report associated with one or more of the printing devices and print jobs.

13. The method for performing paper analytics according to claim 12, wherein the first differential process replaces a plurality of text characters with random characters.

14. The method for performing paper analytics according to claim 12, wherein the second differential process performs one or more of blurring, size-adaptive blurring, pixel randomization and replacement of the image content with a fixed pattern.

* * * * *